(12) United States Patent
Russell et al.

(10) Patent No.: US 6,703,570 B1
(45) Date of Patent: Mar. 9, 2004

(54) DIGITAL PEN USING ULTRASONIC TRACKING

(75) Inventors: Gregory Fraser Russell, Yorktown Heights, NY (US); Barton Allen Smith, Campbell, CA (US); Thomas Guthrie Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/567,720

(22) Filed: May 10, 2000

(51) Int. Cl.[7] ............................................... G09G 5/00
(52) U.S. Cl. ..................... 178/19.03; 178/18.01; 178/18.02; 178/18.03; 178/18.04; 178/19.02; 178/19.05; 178/20.01; 345/173; 345/175; 345/177; 345/179; 345/158; 345/157; 345/159; 369/907
(58) Field of Search .................. 178/19.03, 19.05, 178/20.01, 19.02, 18.01, 18.02, 18.03, 18.04; 345/173, 175, 177, 179, 157, 158, 159; 367/907

(56) References Cited

U.S. PATENT DOCUMENTS

| | | | | |
|---|---|---|---|---|
| 5,121,413 A | * | 6/1992 | Voegtly et al. ............... 375/95 |
| 5,165,415 A | * | 11/1992 | Wallace et al. ............. 600/452 |
| 5,174,759 A | * | 12/1992 | Preston ........................ 434/317 |
| 5,327,263 A | * | 7/1994 | Katagiri et al. ............. 358/471 |
| 5,637,839 A | * | 6/1997 | Yamaguchi et al. .......... 178/19 |
| 6,229,529 B1 | * | 5/2001 | Yano et al. .................. 345/175 |
| 6,265,984 B1 | * | 7/2001 | Molinaroli ............... 340/815.4 |
| 6,300,580 B1 | * | 10/2001 | Shenholz et al. ........ 178/19.02 |
| 6,323,846 B1 | * | 11/2001 | Westerman et al. ......... 345/173 |
| 6,335,723 B1 | * | 1/2002 | Wood et al. ................. 345/173 |
| 6,377,249 B1 | * | 4/2002 | Mumford .................... 345/179 |
| 6,414,673 B1 | * | 7/2002 | Wood et al. ................. 345/173 |

* cited by examiner

*Primary Examiner*—Richard Hjerpe
*Assistant Examiner*—Abbas Abdulselam
(74) *Attorney, Agent, or Firm*—John L. Rogitz

(57) ABSTRACT

A digital pen that has a writing tip includes an ultrasonic (US) transducer on a pen body that generates frames of US pulses toward a receiver base in response to an infrared (IR) synchronizing signal from the base. The first pulse of a frame is adjusted by a modulo of the US period $\tau$ when the time of arrival (TOA) of the first pulse varies from an expected TOA by more than one-half $\tau$. The TOAs of successive $i^{th}$ pulses in the frame, which are one wavelength apart from each other, are adjusted forward in time by subtracting from each pulse TOA$(i-1)\tau$, and then several of the adjusted pulse TOAs in a single frame are averaged together to determine a frame TOA. The frame TOAs from plural receivers on the base are then triangulated to determine a pen position for that frame, with the pen positions being input to a handwriting recognition module.

24 Claims, 7 Drawing Sheets

| Page 21 |
|---|
| #1 |
| #2 |
| #3 |
| |
| New |
| Undo |
| Done |
| Email |
| Fax |
| |
| Name |
| Company |
| Address |
| email |
| Phone # |
| |
| Day |
| Time |
| Subject |
| |
| Call |
| Drawing |
| Expense |
| Notes |
| Order |
| Personal |
| Project |
| To Do |
| Urgent |

110

111 (pointing to Undo/Done)

112 — Tim Smith

FIG. 9

DIGITAL PEN USING ULTRASONIC TRACKING

BACKGROUND OF THE INVENTION

1. Field of the Invention

The present invention relates generally to handwriting data entry, and more particularly to methods and systems for facilitating data entry using a pen input device.

2. Description of the Related Art

Digital writing instruments, interchangeably referred to herein as "digital pens" regardless of whether they write in ink, can be used to capture pen strokes on paper and digitize them, so that the pen strokes can be converted by handwriting recognition software to a digitally-stored record of the writing. In this way, a laborious, tedious step in modern written communication, namely, the manual transcribing of handwriting into a computerized word processor, is eliminated, greatly increasing productivity.

Accordingly, digital pen systems can digitize pen strokes across a substrate, by sensing, in some fashion, the time-dependent position of the pen and converting the positions to pen strokes, for input of digital representations of the pen strokes to a handwriting recognition device. As recognized herein, ultrasonic ("US") systems can be used in which a special pen generates or alters an ultrasonic signal as the pen is moved across a piece of paper. The US signal is sensed by receivers, correlated to a position vis-a-vis each receiver, and the outputs of the receivers then triangulated and correlated to absolute pen positions. A sequence of pen positions can then be digitized for input into handwriting recognition engines. An advantage with US systems is that the writer can write on an ordinary piece of paper that is placed on or nearby a base station which receives the US signals and converts the signals to alpha-numeric characters.

In US handwriting input systems, a US generator in the pen is energized by high voltage, causing a frame of one or more US pulses to be transmitted. Because of the physics underlying US generation, a single frame consists of not one but many pulses, each being delayed from the immediately preceding pulse by the period $\tau$ defined by the US frequency (essentially, the wavelength $\lambda$ of the US signal divided by the speed "c" of sound in the medium through which the signal propagates). Of interest is the first pulse, which represents the "true" position of the pen.

One US handwriting device is disclosed in U.S. Pat. No. 5,637,839. The '839 invention simply uses the first pulse that is detected in a frame as indicating the position of the pen. To alleviate jitter, the '839 invention averages the positions of several temporally sequential frames.

The present invention recognizes several drawbacks to the above-mentioned prior art US device. First, the first pulse detected might not be the first pulse of the frame, because owing to the physics of exciting a US transmitter with high mechanical Q, the amplitude of the pulses decay after excitation energy is removed. Similarly, the amplitudes of the received signal pulses decay over time. Consequently, if the time of arrival of the first pulse that is detected is used in the computation of pen position, the computed pen position can be an entire wavelength away from the actual position. At the high frame repetition rates (and, hence, very short time periods between frames) that are used to optimize pen position resolution (60–300 frames per second), a positional error of an entire wavelength represents a significant error.

Moreover, the present invention understands that alleviating jitter caused by noise and air currents by averaging several frame positions together slows down the effective frame repetition rate and, hence, reduces resolution. Furthermore, the present invention recognizes that using the time of arrival of the leading edge of a detected pulse can introduce errors, since the pulse width and, hence, temporal position of the leading edge, varies with pulse amplitude. The present invention has considered the above problems and has provided the below-disclosed solutions to one or more of them.

SUMMARY OF THE INVENTION

A digital pen system includes an elongated pen defining a writing tip, and an ultrasonic (US) transducer oriented on the pen to direct frames of US energy outwardly from the pen, with each frame including plural receive pulses. At least two detectors are positioned on a base, such as a laptop computer, for receiving the pulses, with each pulse being associated with at least one pulse time of arrival (TOA) relative to at least one detector. A processor is on the base, and the processor receives signals from the detectors and in response thereto outputs position signals representative of positions of the pen based on at least one frame TOA. In accordance with the present invention, the processor determines the frame TOA based on determining that a TOA of a first pulse in a frame deviates from an expected TOA more than a predetermined time period, and/or averaging together plural receive pulse TOAs associated with receive pulses in a single frame.

In a preferred embodiment, the US energy defines a US period $\tau$, and the predetermined time period is one-half the US period $\tau$. The processor modifies either the expected TOA or the TOA of the first pulse by a modulo of the US period $\tau$ when the predetermined time period is exceeded.

As set forth in detail below, the processor stores plural frame TOAs, and the processor modifies stored frame TOAs when the TOA of the first pulse is earlier than the expected TOA by at least the predetermined time period. Further, the processor adjusts the pulse TOAs to the first pulse TOA by subtracting from each $i^{th}$ pulse TOA a period equal to $(i-1)\tau$ to render respective adjusted pulse TOAs which are then averaged together to establish the frame TOA.

In a preferred embodiment a pen electromagnetic (EM) device such as an IR transmitter is on the pen, and an EM device such as an IR receiver is on the base for receiving an EM synchronizing signal from the pen EM device. Per present principles, the US energy is synchronized with the synchronizing signal.

In another embodiment, the base EM device transmits the synchronizing signal to the pen. If desired, a contact sensor can be provided on the pen for generating a contact signal representative of the tip contacting a surface, with the pen generating frames based at least in part on the contact signal. In one preferred embodiment, the contact signal varies in proportion to a pressure on the tip, and the pulse width of the signal generated by the pen EM device is proportional to the contact signal.

Also, a grip sensor can be provided on the pen and a high voltage source can also be provided on the pen for energizing the US transducer. The grip sensor generates an enabling signal for the high voltage source.

The preferred processor determines whether the expected TOA is within a lull period (quiet temporal zone), and the processor adjusts a frame repetition rate based at least partially thereon. At least one pulse can be characterized by a leading edge, a center, and a trailing edge, and the pulse TOA associated therewith is a TOA of the center of the pulse.

In another aspect, in a base associated with an ultrasonic (US) pen, a processor includes logic for undertaking method acts that include receiving frames of US pulses from the pen. For each frame, a measured time of arrival (TOA) of at least one pulse is modified based on at least one US period to generate a frame TOA.

In still another aspect, a logic device is disclosed for executing method acts for electronically associating sensed handwriting on an actual form with fields of an electronically-stored virtual form. The method acts executed by the logic device include sensing at least one form location of the actual form relative to a base. The form location has a corresponding virtual form location in electronic memory. Handwriting on the actual form is sensed, with the handwriting having a handwriting location relative to the base and with the handwriting location being digitized into a corresponding virtual handwriting location in memory. The method undertaken by the logic device also includes associating the virtual handwriting location with the virtual form location.

The details of the present invention, both as to its structure and operation, can best be understood in reference to the accompanying drawings, in which like reference numerals refer to like parts, and in which:

BRIEF DESCRIPTION OF THE DRAWINGS

FIG. 9 is a view of an alternate form, illustrating how a user can indicate that a particular alpha-numeric string is to be correlated to a particular field on the form.

DETAILED DESCRIPTION OF THE PREFERRED EMBODIMENTS

Figure 1:
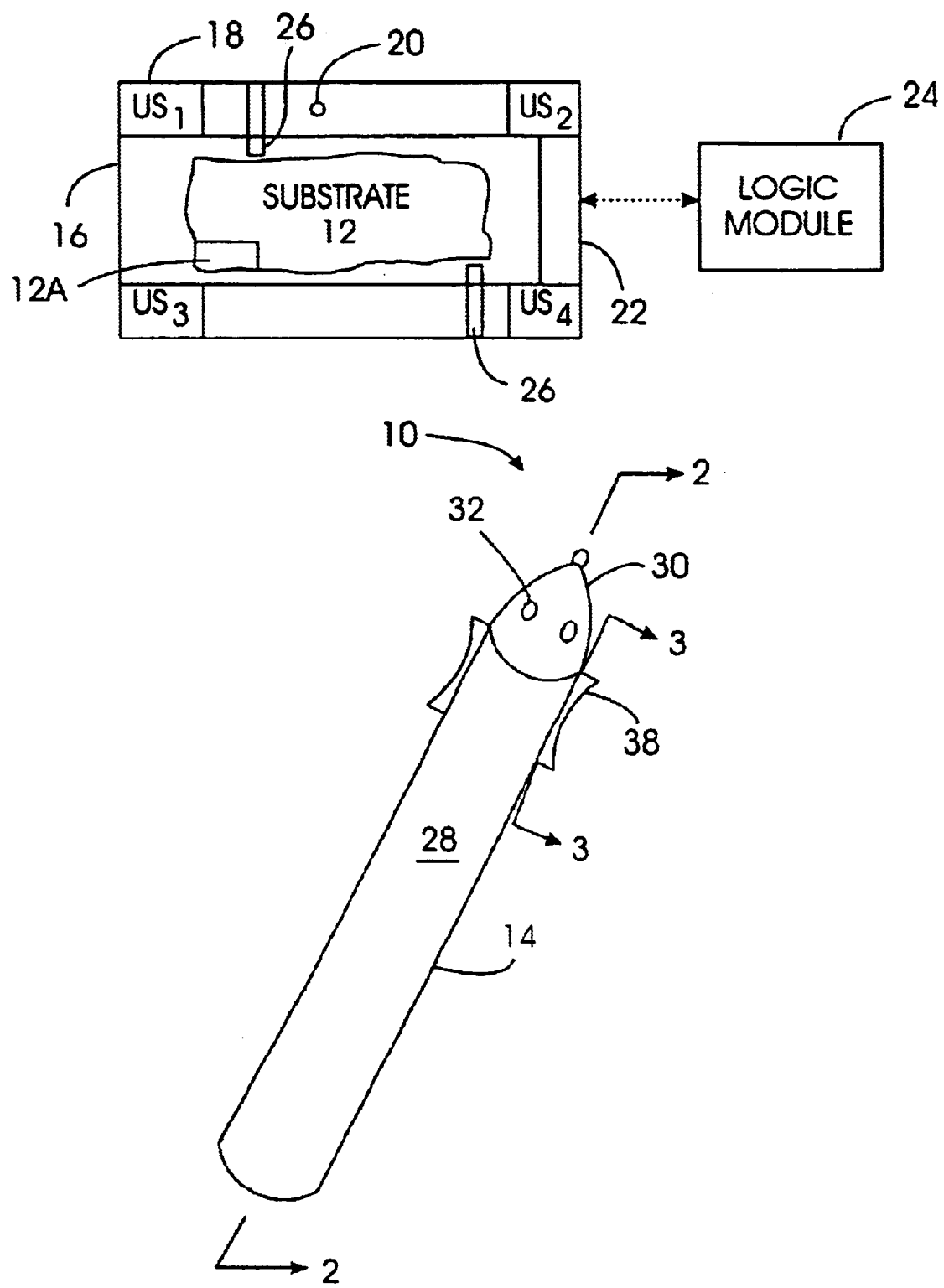
FIG. 1 is a schematic view of the pen input system of the present invention.

Referring initially to FIG. 1, a pen input device is shown, generally designated 10, which includes a substrate 12 and at least one lightweight elongated hollow plastic or metal pen body 14. The preferred embodiment set forth herein contemplates a pen body 14 that can be manipulated by a writer to write ink or graphite or other substance onto a substrate 12 such as paper, including paper forms having form fields 12a printed thereon, while digitally recording strokes across the substrate 12. It is to be understood, however, that the principles advanced herein can be used with a pen body 14 that is a stylus-type device that does not necessarily deposit ink or other substance onto a substrate. The substrate 12 can be positioned on a base 16 as shown. Alternatively, the substrate 12 can be positioned nearby the base 16. In one preferred embodiment the base 16 is an IBM Thinkpad® modified as set forth herein. The substrate 12 can be a blank piece of paper or, as discussed further below, a form on which fields are preprinted. When the substrate 12 is a form the base 16 can electronically store a virtual copy of the form for purposes to be shortly disclosed.

With particular regard to the base 16, at least two ultrasonic (US) receivers 18 are disposed on the base 16. In the particular embodiment shown, four receivers 18 are positioned on the base 16. Also, an electromagnetic transducer 20 is disposed on the base 16. In one preferred embodiment the transducer 20 is an infrared (IR) transmitter.

The base 16 includes an internal processor 22 that communicates with the US receivers 18 and IR receiver 20 and that accesses a software-implemented or logic circuit-implemented logic module 24 to undertake the below-described logic of the present invention. It is to be understood that the processor of the present invention can be a general purpose computer appropriate for its intended function and programmed to undertake appropriate method steps set forth herein. For example, the processor 22 can be or can include a microprocessor such as a Scenix SX18, a digital signal processor such as Analog Devices ADSP2104L, or a field programmable logic array such as a Xilinx XC2S39, or an ASIC. Alternatively, the processor 22 can be located outside the base 16 and remotely linked to the receivers 18 by radio waves, ultrasonic waves, IR link, or other remote means. The processor 22 can be included in a desktop computer, laptop computer such as a Thinkpad® made by International Business Machines Corporation (IBM) of Armonk, N.Y., or a personal digital assistant such as a 3COM Palm Pilot®, or a video game such as a Sony Playstation or Sega Dreamcast®.

It is to be further understood that the control components such as the module 24 are executed by logic components such as are embodied in logic circuits on, e.g., an ASIC chip, or in software contained in an appropriate electronic data storage, e.g., random access memory (RAM), or hard disk drive and/or optical disk drive, or DASD array, magnetic tape, electronic read-only memory, or other appropriate data storage device that is conventionally coupled to the processor 22 for executing the module 24. For example, the control components can be embodied in a flash memory.

The flow charts herein illustrate the structure of the present logic. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown. In other words, the module 24 may be a computer program that is embodied in software or firmware and that is executed by a processor as a series of computer-executable instructions. In an illustrative embodiment of the invention, the computer-executable instructions may be lines of compiled C++ compatible code.

For purposes to be shortly disclosed, the base 16 can include one or more bar code readers 26. The bar code readers 26 read bar codes on the substrate 12 to determine form or page number and positions of the fields 12a relative to the base 16. In so doing, the processor 22 can determine a virtual location for virtual fields of the virtual counterpart to the actual form substrate 12.

Figures 2, 3:
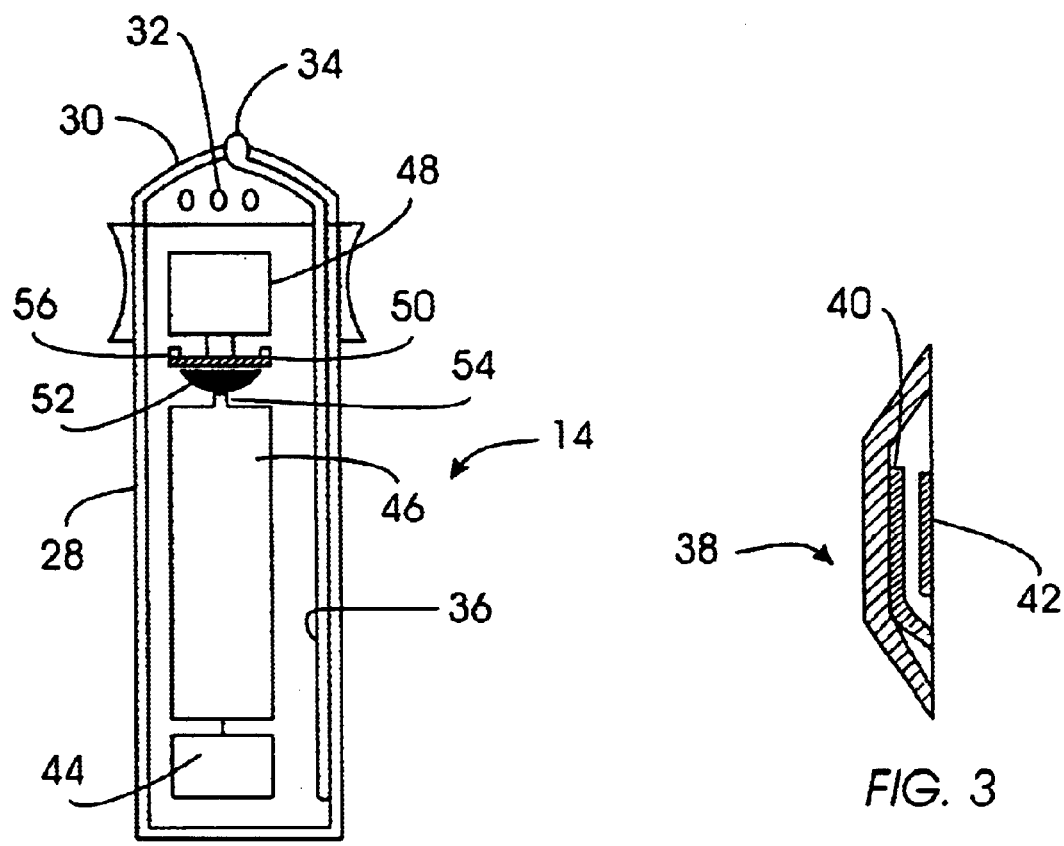
FIG. 2 is a cross-sectional diagram of the pen as seen along the line 2—2 in FIG. 1.
FIG. 3 is a cross-sectional diagram of the grip sensor as seen along the line 3—3 in FIG. 1.

FIGS. 1–3 show details of the pen 14. As shown, the pen 14 includes a pen body 28 that terminates in a distal, generally dome-shaped, preferably clear plastic end cap 30. Ports 32 are formed in the plastic cap 30. The ports 32 provide an acoustic radiating pattern that is radially symmetric about the pen 14.

A distal writing tip 34 protrudes from the end cap 30. When the pen 14 is an ink pen, the writing tip communicates with an ink reservoir 36 that extends along one side of the pen 14 as shown.

The pen 14 also has an ergonomic rubber grip 38. When a person holds the pen 14 by the grip 38, a grip pressure switch generates a signal representative thereof. In one exemplary but non-limiting embodiment shown in FIG. 3, the grip pressure switch can include a leaf spring 40 that cooperates with a fixed plate 42 to generate a signal when the grip 38 is held by a person. The signal is sent in turn to an electronic circuit 44 in the pen 14. The circuit 44 includes, among other things, a microprocessor and a high voltage power source that converts DC energy from a battery 46 into high voltage for exciting a US transducer 48 with, e.g., 100 volts for half the period of resonance of the transducer, and the high voltage power source is enabled only when the grip 38 is held by a person. The circuit establishing the high voltage power source can include, for instance, a transistor-based oscillator applied to a step-up transformer as are used in flash cameras. The charge can be stored in a capacitor to smooth voltage, with the microprocessor being energized from the high voltage source via a current limiting resistor and a voltage setting Zener diode. The US transducer 48 can be a 40 KHz transducer that is excited at a frame rate of 60–300 times per second. In one preferred embodiment, the battery 46 is a type AAA Nickel Metal Hydride rechargeable battery.

Referring back to FIG. 2, when a force is applied to the tip 34, it is transferred through the transducer 48 to a circuit board 50, with the circuit board 50 having formed thereon a copper or other conductive ring. The circuit board 50 is connected to the periphery of a convex flexible metal disc 52, the apex of which in turn contacts the positive terminal 54 of the battery 46. As the circuit board 50 compresses the metal disc 52, the distance between the disc 52 and conductive ring under the disc 52 decreases, effectively changing the capacitance of a capacitor established by the disc 52/conductive ring. The microprocessor of the circuit 44 receives this and controls the pulse width of at least some of the IR pulses transmitted by one or more IR transducers 56 on the circuit board 50, optically coupled to the end cap 30. Accordingly, when the processor 22 of the base 16 receives the signal from the IR transducer 20, the processor 22 can determine how hard the person is pressing down against the substrate 12 based on the pulse width, to thereby determine when the pen tip touches the substrate and how wide the corresponding handwriting line should be when it is electronically generated as set forth below. It is to be understood that the IR transducers 56 transmit IR light through the end cap 30 toward the base 16 when a person writes on the substrate 12, and that US pulses from the transducer 48 exit the ports 32 in the end cap 30 when the person is writing with the pen 14. It is to be further understood that the contact sensor can include, e.g., force sensing resistors or other force sensors.

Alternatively, the pen 14 can be tethered to the base 16 by an electric cable. In such an embodiment, the IR communication system disclosed herein and the battery 46 can be omitted, since both communication and electrical power can be sent through the tether to the pen.

If desired, damping can be implemented for the US transducer 48. In one embodiment, a voltage of opposite polarity to the excitation voltage is applied to the transducer 48 just after it is excited to minimize unwanted oscillations. Or, the transducer 48 can be passively damped by grounding the transducer 48 after the excitation voltage is applied.

Figure 4:
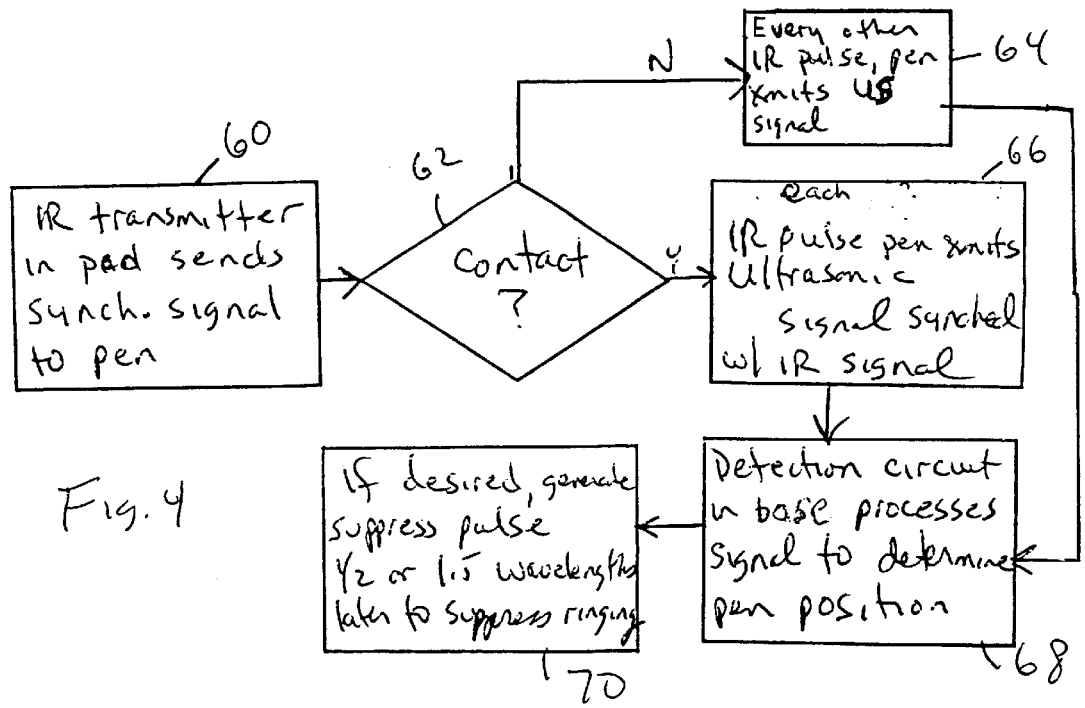
FIG. 4 is a flow chart showing the overall logic by which pen position signals are generated.

FIG. 4 shows the overall logic of the present invention. Commencing at block 60, the IR transducer 20 of the base 16 sends a synchronizing pulse to the pen 14. It is to be understood that alternatively or in addition, the pen 14 can signal when it is transmitting a US frame by simultaneously transmitting an IR synchronization signal to the base 16.

When the base 16 transmits the synchronizing IR pulse, the pulse is detected by the IR transducers 56 on the pen 14. Moving to decision diamond 62, it is determined whether the writing tip 34 is in contact with a surface, e.g., the substrate 12. If not, every other IR synchronizing pulse the pen 14 transmits an US signal. Thus, the position of the pen 14 can be tracked even when it is lifted from the substrate 12 to, e.g., dot an "i". In contrast, when the pen is in contact the logic flows to block 66 to transmit a US frame every time an IR synchronization signal is received. In this way, the base knows whether the pen is in contact with the paper. Alternatively, as noted above the pen 14 can transmit an IR signal to the base whose occurrence indicates the transmission of US energy (for synchronization), and whose pulse width is proportional to the pressure on the tip 34.

Proceeding to block 68, the detection circuit in the base 16 processes the US frames and based on when US signals arrive at the receivers 18 (adjusted as noted further below) and after digitization, the processor 22 triangulates the position of the pen relative to the base. The digitized pen positions can then be input into a handwriting recognition engine for reduction of the position signals to alpha-numeric characters. The handwriting recognition engine can be any suitable handwriting recognition system, such as those disclosed in U.S. Pat. Nos. 5,644,652, 5,343,537, or 5,550,931, all owned by the present assignee and all incorporated-herein by reference. As mentioned above, at block 70, a damping voltage or shunt (electrical short) can be applied to the US transducer 48 to suppress ringing of the transducer.

Figure 5:
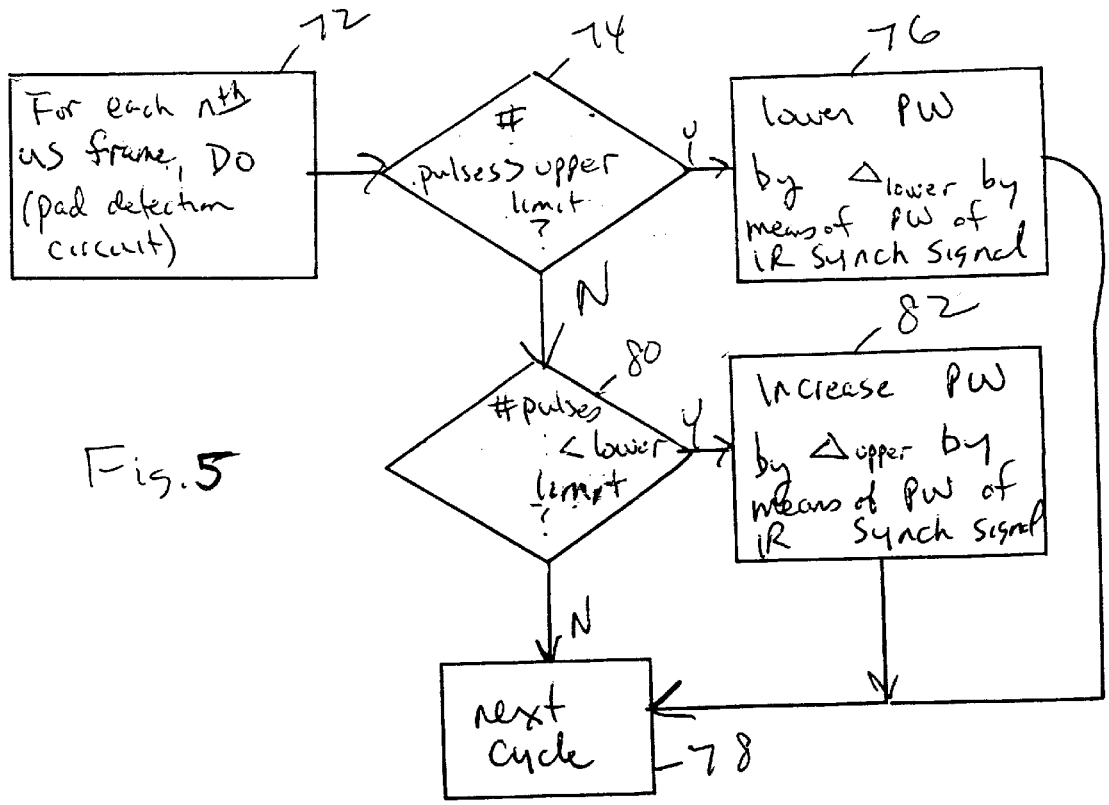
FIG. 5 is a flow chart showing the preferred pulse width adjusting logic.

FIG. 5 shows that in one preferred embodiment, the pulse width and, hence, power of the US energy generated by the transducer 48 can be dynamically established. Commencing at block 72, for every $n^{th}$ frame, the processor 22 of the base 16 enters a power adjust routine as follows. At decision diamond 74 it is determined whether the number of receiver pulses in a frame exceed an upper limit, e.g., twenty (20), and if so the logic flows to block 76 to lower the US pulse width by a predetermined delta amount (or multiple thereof) by causing the IR transmitter 20 on the base 16 to transmit the next synchronization pulse having a pulse width adjusted accordingly. When the pen 14 receives this reduced pulse width synchronization signal, its microprocessor lowers the pulse width transmitted by the US transducer 48. The next cycle is then entered at block 78.

If, on the other hand, the test at decision diamond 74 is negative, the logic next tests whether the number of receiver pulses in a frame was less than a lower limit, e.g., twelve (12), and if so the logic flows to block 82 to increase the US pulse width by a predetermined delta amount (or multiple thereof, up to a maximum of $\frac{1}{2}\tau$) by causing the IR transducer 20 on the base 16 to transmit the next synchronization pulse having a pulse width adjusted accordingly. When the pen 14 receives this increased pulse width synchronization signal, its microprocessor increases the pulse width transmitted by the US transducer 48. The next cycle is then entered at block 78.

Figure 6:
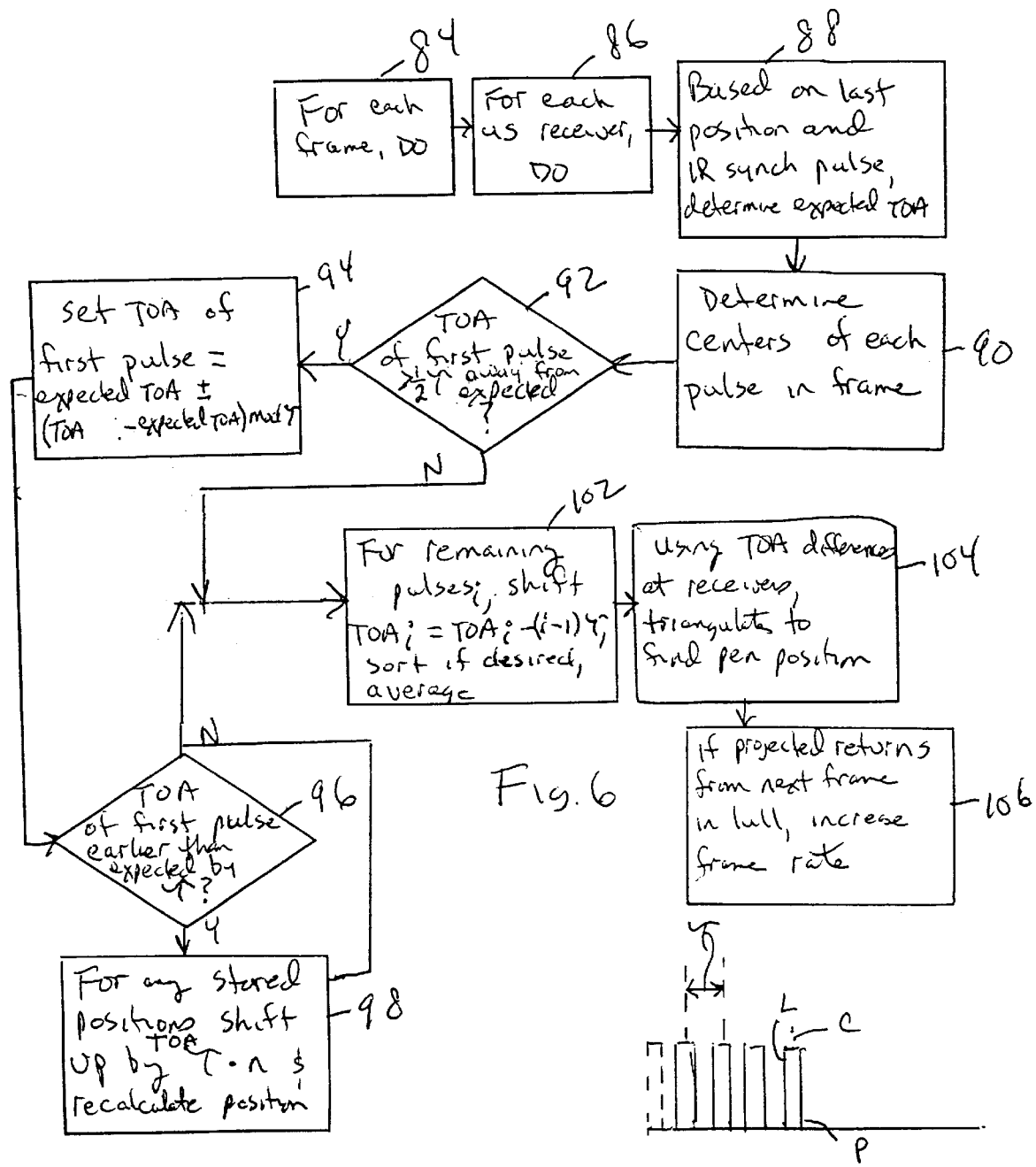
FIG. 6 is a flow chart showing the preferred logic for determining pen position.
Figure 7:
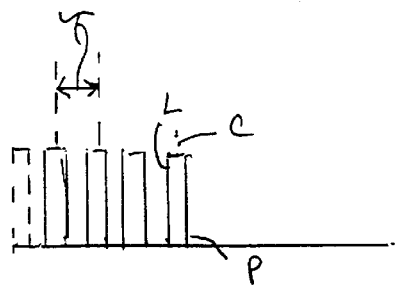
FIG. 7 is a schematic diagram of a frame of pulses.

FIG. 6 shows how the processor 22 processes received signals from the US receivers 18 on the base 16 to determine pen position. Every frame, the processor enters the logic at block 84 for every receiver, as indicated at block 86. Moving to block 88, based on the last position and time of IR synchronization pulse, the processor 22 determines an expected pulse time of arrival (TOA). Proceeding to block 90, the processor determines the center of at least some and preferably all received pulses in a single frame. Referring briefly to FIG. 7, the present invention recognizes that since the width of a receiver pulse P (and, hence, its leading edge L) varies with amplitude for a receiver composed of a comparator with a fixed threshold, the TOA of the center C of the pulse represents a more accurate measurement of the TOA of the pulse than does the TOA of the leading edge L.

Proceeding to decision diamond 92, it is determined whether the TOA of the first pulse in a frame deviates from the expected TOA by more than a predetermined period. In one preferred embodiment, this predetermined period is one-half the US period, referred to herein as $\tau$. Because of the relatively high frame repetition rates used herein, it is not likely that a pen would be moved further than one-half of the US wavelength (the period $\tau$ times the speed of sound) between two successive frames, and so if the test at decision diamond 92 is positive, indicating that an adjustment is required, the logic moves to block 94. At block 94, the TOA of the first pulse is adjusted by adding to the expected TOA (or subtracting from the expected TOA, depending on whether the actual TOA was before or after the expected TOA) the difference between the actual and expected TOAs, modulo $\tau$.

From block 94 the logic moves to decision diamond 96, wherein it is determined whether the TOA of the first pulse was earlier than expected. If it was, indicating that the actual first pulses of to previous frames had not been detected, the logic can, if desired, move to block 98 to shift forward in time by $\tau$ (or multiples thereof, as appropriate) the TOAs determined for previous frames and stored in electronic memory.

From decision diamonds 92 or 96 for negative tests and from block 98, the logic next proceeds to block 102, wherein the individual pulse TOAs are shifted forward in time to the first pulse by subtracting from each pulse$_i$ TOA the product of the US period $\tau$ and the position less one of the pulse. Thus, for example, for the third pulse, which is two periods behind the first pulse, the adjusted pulse TOA will be the actual third pulse TOA minus the US period $\tau$ times two (2). If desired, the pulses can then be sorted in increasing order of time, and the smallest and largest values removed. The TOAs of the remaining (middle) pulses are then averaged to render a frame TOA. In this way, more accurate and faster estimations of the actual frame TOA are rendered than are rendered by systems that do not average times or that average times between frames, as opposed to pulse times within frames. As mentioned above, after determining a frame TOA for each receiver 18, the logic triangulates a pen position at block 104 using well-understood principles of geometry.

If desired, the logic can move to block 106 to increase the frame repetition rate and, hence, temporal resolution of the system by projecting when the next frame should arrive and then determining whether, for the particular geometries involved, the frame's pulses will arrive at a lull. If so, the frame rate can be increased as appropriate to move the frame forward in time.

Figure 8:
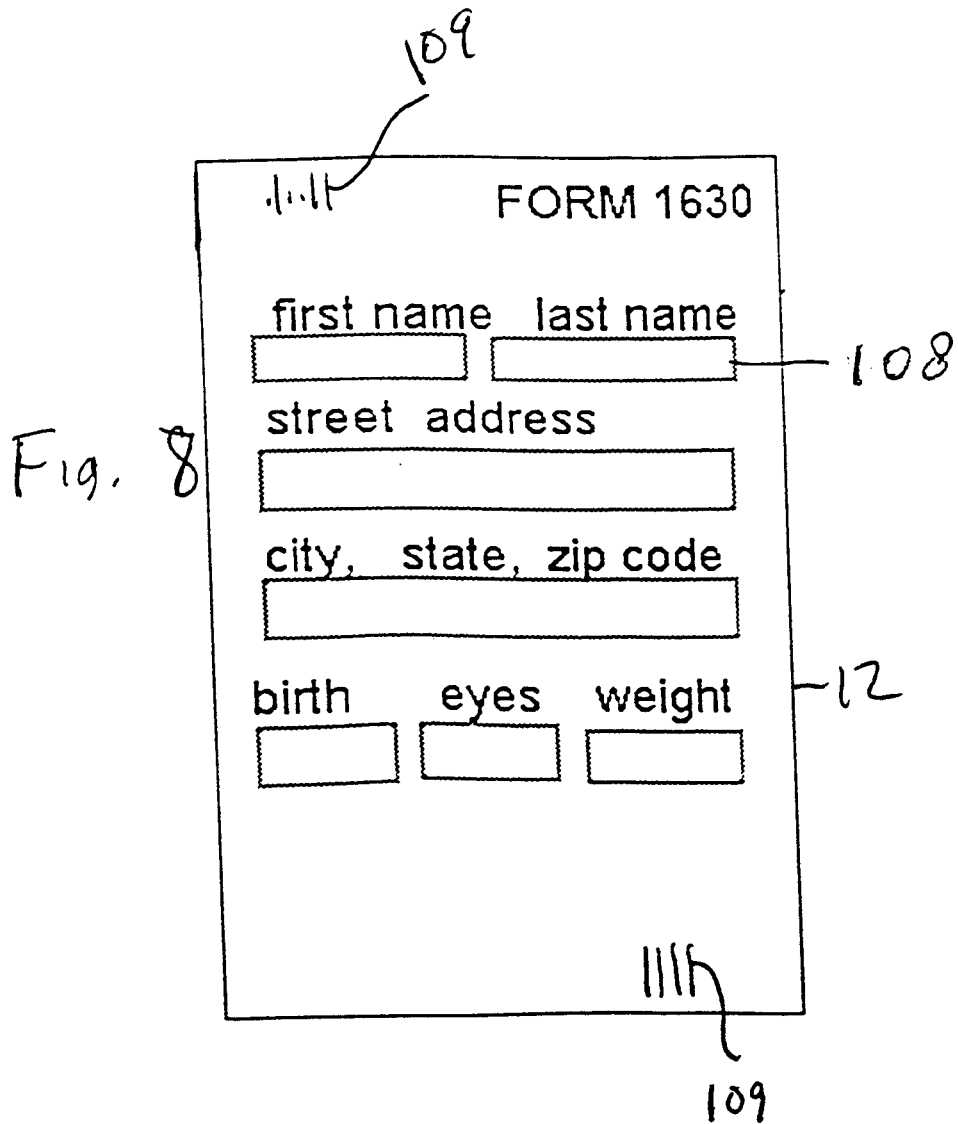
FIG. 8 is a top plan view of a preprinted form.

As set forth above, the substrate 12 can be a plain piece of paper that can be disposed on or near the base 16. Nonetheless, the present invention also envisions use of special paper to add further functionality. FIG. 8 shows a substrate 12 that is an actual form with form fields 108 printed thereon. Also, the form can include bar codes 109 that are readable by the bar code reader or readers 26 on the base 16. By means of reading the bar codes 109, the processor 22 can determine not only the identity of the form, but also the position of the form substrate 12 relative to the base 16. The term "bar code" is a generic term for optical marks on a substrate that spatially encode digital information. Alternatively, while the above discussion contemplates registration of the form using bar codes, registration can be provided using an registration edge or registration holes in the substrate.

As mentioned above, the processor 22 also accesses a virtual copy of the form, stored in memory either concurrently with handwriting entry or post handwriting entry. Accordingly, when a user writes in an actual form field 108, the position of the writing is determined as described above and then associated with the position of the virtual counterpart of the field 108 and stored in memory. When the virtual copy of the form is to be printed, the handwriting, now digitized, is printed in the corresponding field.

Thus, the virtual copy of the form can include position, page number, and prior knowledge of the field 108 location to associate handwriting with a computerized version of the substrate 12. The page number corresponds to a form number, preferably determined through a look-up table that also contains the location of the form field 108, stored as the lower left and upper right position of a rectangular box that bounds the field 108. Any handwriting that occurs within field boundary is assigned to the field.

Now referring to FIG. 9, yet another paper substrate 110 is shown with visible fields 111. Invisible bar codes that can be read by a bar code reader in the pen (not shown) cover the paper substrate 110 to indicate page position and fields. As shown in FIG. 9, categories are presented on the paper substrate 110, allowing the user to categorize writing during or after handwriting capturing. With this feature, a writer writes information onto a writing area 112 as convenient for the writer, and afterwards, which could be seconds, minutes or days, the writer marks up the writing, selecting a category and the corresponding writing, as described below.

Specifically, on, e.g., the left margin of the paper substrate 110 is a column of cells (a spreadsheet term for vertical boxes). Each cell contains a word or other visible icon that is recognizable by the writer. These words or icons are also referred to herein as "tags".

In one preferred embodiment, there are two types of words, namely, ACTION words including New, Undo, Done, Email, Fax, and CATEGORY words including Name, Address, Company, Subject, Drawing. When a writer underlines a CATEGORY cell such as name as shown in FIG. 9, an indicator light on the pen can turn YELLOW, indicating that the next writing selected in the area 112 will be stored in the selected category. This is referred to as "tagging".

As shown in FIG. 9, one way to select writing in the area 112 is to underline the writing, as has been done in the case of the name "Tim Smith". Or, a box or circle can be drawn around the writing, or a horizontal line can be drawn to the left of the writing, and so on.

As understood herein, placing writing in categories facilitates search and reference. For example, the name field can searched for a particular name and writing that occurred nearby the tagged name (temporally or spatially near) can be displayed. Moreover, handwriting recognition is improved through the use of categories by limit the domain of possible words.

In one preferred embodiment, the listed categories definitions include:

User 1,2,3,4 are user defined categories;

Name, Company, Address, Phone #, Fax #, Day, Time, and Subject generally relate to faxes, email, business contacts, and appointments;

Call are people to call;

Drawing marks an area of paper that contains a drawing, e.g. sketch or map;

Expense typically are entries for expense reports, e.g. lunch $12.50;

Notes can be the body of a fax or email, memos;

Project can be the title of the project, the body of the writing can be untagged, or tagged as notes, drawing, etc.;

Order can be things to purchase or orders customers are requesting;

Personal can be all notes that are to be kept separate from work;

To Do are items that need to be done; and

Urgent flags writing that needs immediate attention. It can also be used to select email priority.

On the other hand, when an ACTION cell is underlined, the indicator light 114 can turn, e.g., GREEN for a few seconds. In one preferred embodiment, the listed ACTION definitions include:

New Indicates that writing to come is not associated with the previously selected writing;

Undo Undoes the last categorization;

Done Tells the handwriting recognition engine that entry of a fax or email is complete;

Email Sends Email. Either enter the email address or name for look up; and

Fax Sends Fax. Either the fax # or name is entered for look up.

When the contents of the memory 24 are downloaded to a computer, the computer interprets and acts on the ACTION words. For example, if the user underlined "Fax", "Phone #", and "Notes", the handwriting selected by the user would be faxed to the phone number specified by the user.

Figure 10:
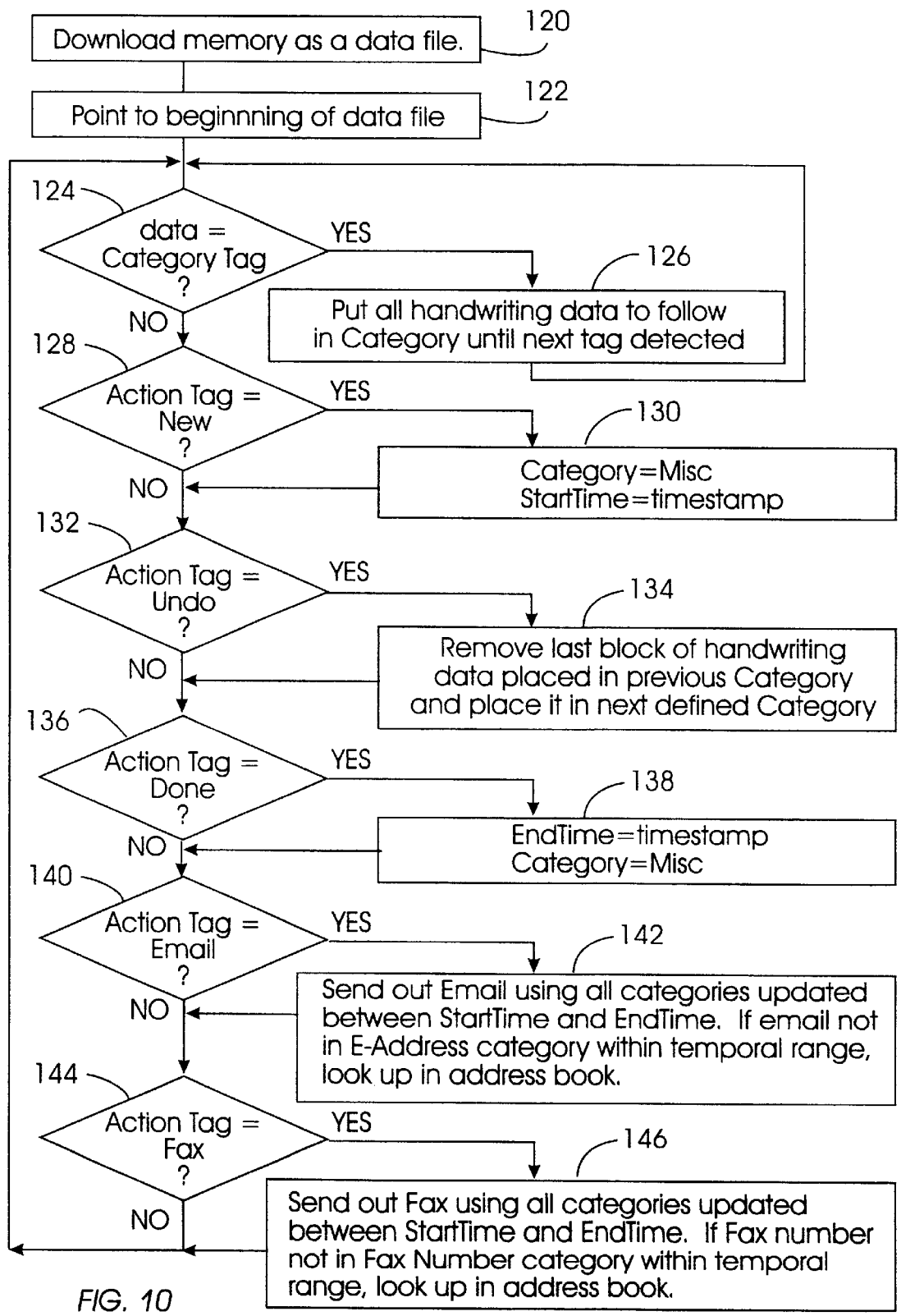
FIG. 10 is a flow chart of the tag processing logic.
Figure 4:
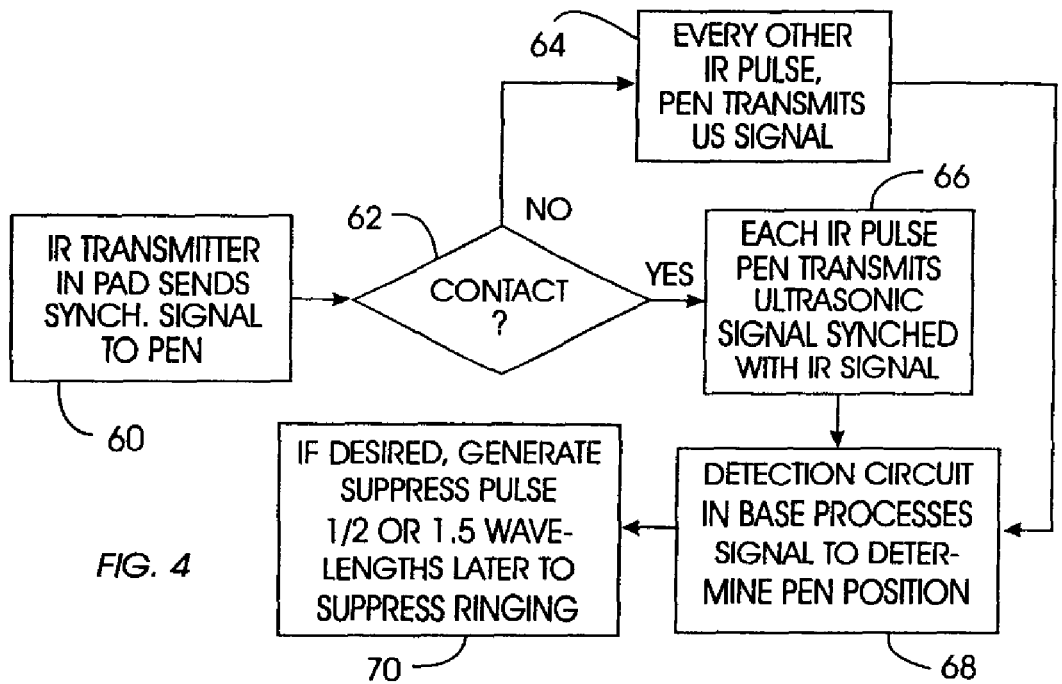
Figure 5:
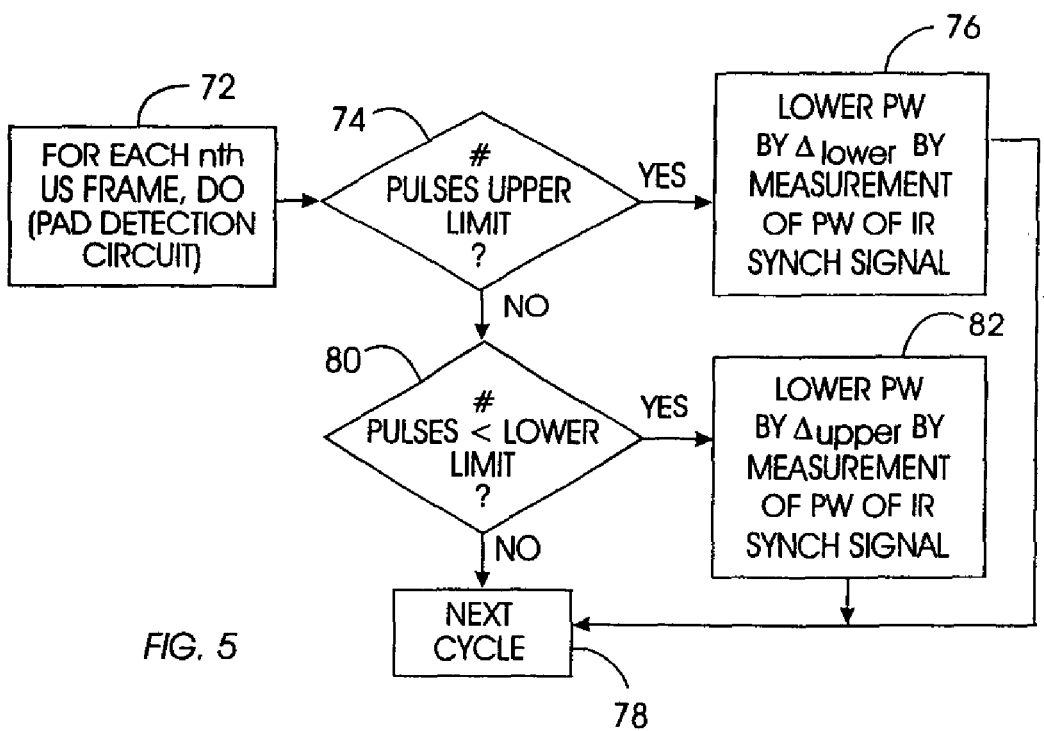
Figure 6:
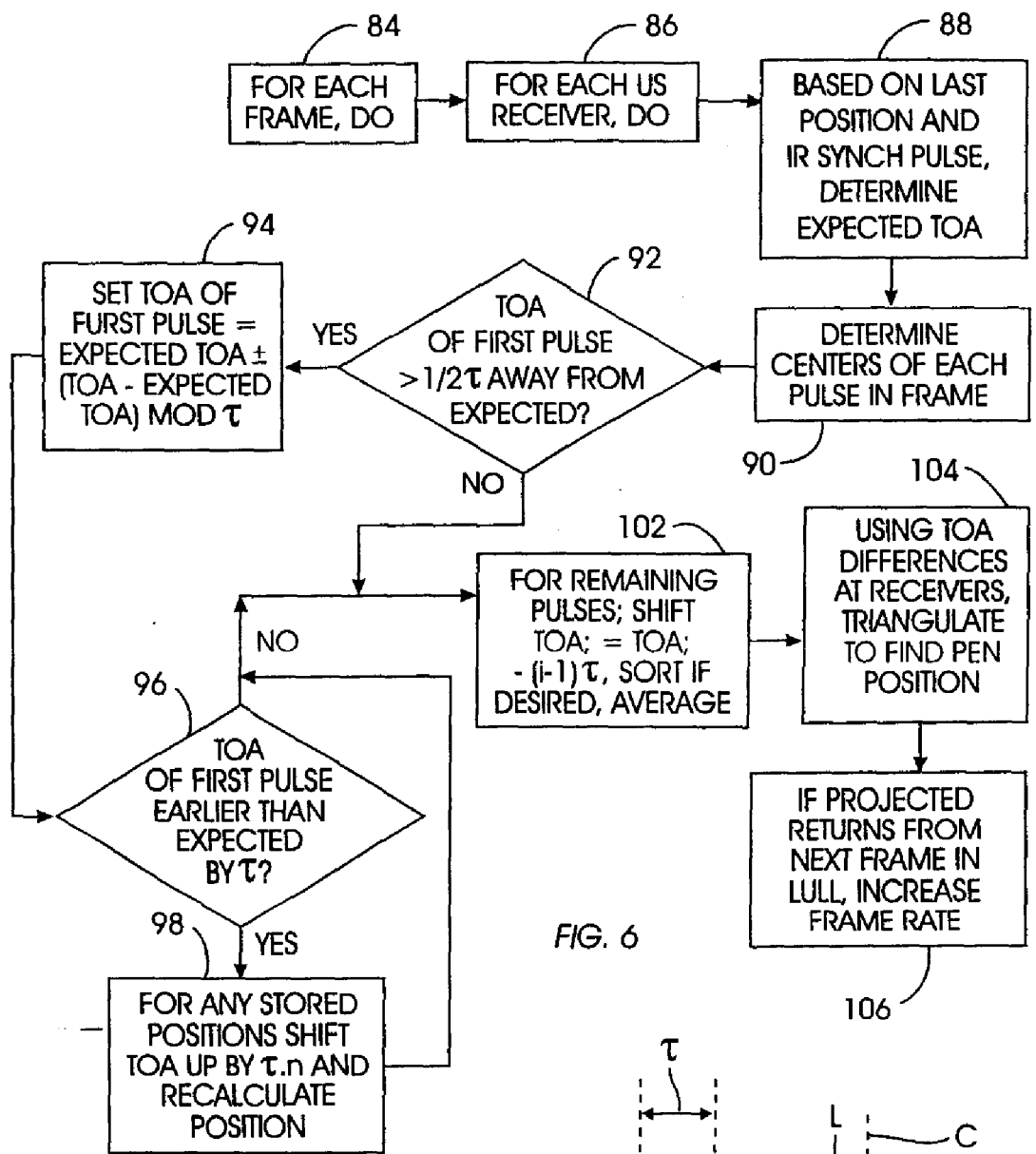
Figure 7:
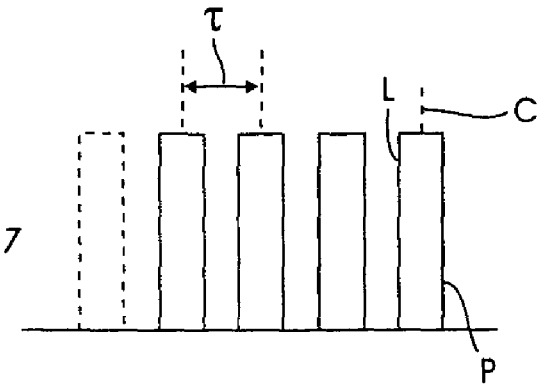
Figure 8:
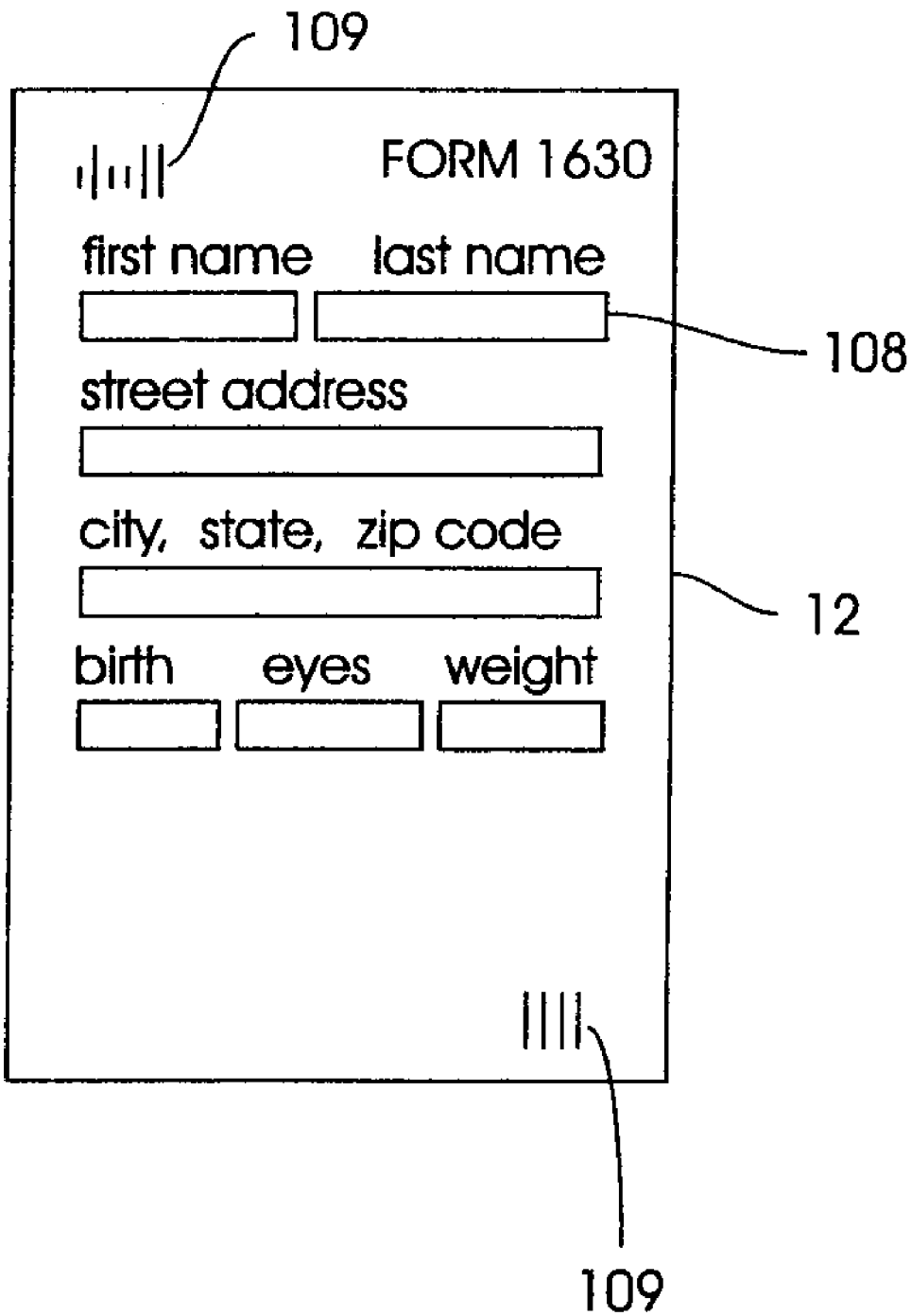

FIG. 10 shows the logic of a preferred tag processing program, for example run on a personal computer. In a preferred embodiment, the processor 22 time stamps handwriting and tag data as it is received and stores these time stamps into memory. In block 120 the memory is stored as a data file. The data file is processed starting at the beginning, by resetting a file pointer in block 122. If the data is a category tag (decision diamond 124) all the subsequent handwriting data (including time stamps) is placed in the category specified by the tag (block 126) until a new tag is detected.

If the tag is the action tag New (decision diamond 128), a program variable StartTime is set to the most recent time stamp read from the data file (block 130). The category is set to a category called Misc where all untagged handwriting is stored. If the action tag is Undo (decision diamond 132), the user is indicating that they mis-categorized the previous information, so the previous block of handwriting is removed from the last category and placed in the next category specified by user, that is the next category that appears in the data file (block 134). If the action tag is Done (decision diamond 136), a program variable EndTime is set to the most recent time stamp read from the data file and the category is set to Misc (Block 138).

If the action tag is Email (decision diamond 140), an email is sent using all the categories that have been updated between the StartTime and EndTime. If an email address does not exist in E-Address category within the StartTime and EndTime time stamps, the email is searched in the user's address book (block 142). If the tag processing program can not find the email, it notifies the user that they tried to send an email to an unknown e-address.

If the action tag is Fax (decision diamond 144), a fax is sent using all the categories that have been updated between the StartTime and EndTime. If a fax number does not exist in Fax Number category within the StartTime and EndTime time stamps, the name is searched in the user's address book (block 142). If the tag processing program can not find the fax number, it notifies the user that they tried to send a fax to an unknown fax number.

While the particular DIGITAL PEN USING ULTRASONIC TRACKING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one" unless otherwise recited. All structural and functional equivalents to the elements of the above-described preferred embodiment that are known to those of ordinary skill in the art are expressly incorporated herein by reference and are intended to be encompassed by the present claims.

We claim:

1. A digital pen system, comprising:

an elongated pen defining a writing tip;

an ultrasonic (US) transducer oriented on the pen to direct frames of US energy outwardly from the pen;

at least two detectors on a base receiving the US energy and outputting plural pulses, each pulse being associated with at least one pulse time of arrival (TOA) relative to at least one detector; and a processor on the base and receiving signals from the detectors and in response thereto outputting position signals representative of positions of the pen based on at least one frame TOA, the processor determining the frame TOA based at least in part on at least one of: determining that a TOA of a first pulse in a frame deviates from an expected TOA by at least a predetermined time period, and averaging together plural pulse TOAs associated with pulses in a single frame.

2. The system of claim 1, wherein the US energy defines a US period $\tau$, and the predetermined time period is at least one-half the US period $\tau$.

3. The system of claim 2, wherein the processor modifies one of: the expected TOA, and the TOA of the first pulse, by a modulo of the US period $\tau$ when the predetermined time period is deviated from.

4. The system of claim 1, wherein the processor stores plural frame TOAs, and the processor modifies stored frame TOAs when the TOA of the first pulse is earlier than the expected TOA by at least the predetermined time period.

5. The system of claim 1, wherein the processor subtracts from at least some pulse TOAs a period equal to an integer times $\tau$ to render respective adjusted pulse TOAs.

6. The system of claim 5, wherein the processor averages together at least two adjusted pulse TOAs to establish the frame TOA.

7. The system of claim 3, wherein the processor subtracts from at least some pulse TOAs a period equal to an integer times τ to render respective adjusted pulse TOAs, the processor averaging together at least two adjusted pulse TOAs to establish the frame TOA.

8. The system of claim 1, further comprising a pen electromagnetic (EM) device on the pen and a base EM device on the base for communicating an EM synchronizing signal therebetween, the US energy being synchronized with the synchronizing signal.

9. The system of claim 8, wherein the base EM device transmits the synchronizing signal to the pen.

10. The system of claim 8, further comprising a contact sensor on the pen for generating a contact signal representative of the tip contacting a surface, the pen generating frames based at least in part on the contact signal.

11. The system of claim 8, further comprising a contact sensor on the pen for generating a contact signal proportional to a pressure on the tip, and the pulse width of the signal generated by the pen EM device is proportional to the contact signal.

12. The system of claim 1, further comprising a grip sensor on the pen and a voltage source on the pen for energizing the US transducer, the grip sensor generating an enabling signal for the voltage source.

13. The system of claim 1, wherein the processor determines whether the expected TOA is within a lull period, and the processor adjusts a frame repetition rate based at least partially thereon.

14. The system of claim 1, wherein at least one pulse is characterized by a leading edge, a center, and a trailing edge, and the pulse TOA associated therewith is a TOA of the center of the pulse.

15. The system of claim 1, wherein the pen is movable against a substrate including visible form fields, the processor having access to an electronically stored facsimile of the substrate for electronically correlating pen positions to virtual fields.

16. The system of claim 1, wherein the detectors are attached to a laptop computer.

17. In a base associated with an ultrasonic (US) pen, a processor including logic for undertaking method acts comprising:

receiving frames of US pulses from the pen; and for each frame, modifying a time of arrival (TOA) of at least one pulse based on at least one US period to generate a frame TOA.

18. The processor of claim 17, wherein each pulse is associated with at least one pulse time of arrival (TOA) relative to at least one detector on the base, and the method acts undertaken by the logic further comprise:

outputting position signals representative of positions of the pen based on at least one frame TOA, the processor determining the frame TOA based at least in part on at least one of: determining that a TOA of a first pulse in a frame deviates from an expected TOA by at least a predetermined time period, and averaging together plural pulse TOAs associated with pulses in a single frame.

19. The processor of claim 18, wherein the predetermined time period is at least one-half the US period, and the processor modifies one of: the expected TOA, and the TOA of the first pulse, by a modulo of the US period when the predetermined time period is deviated from.

20. The processor of claim 18, wherein the method acts undertaken by the logic include storing plural frame TOAs, and modifying stored frame TOAs when the TOA of the first pulse is earlier than the expected TOA by at least the predetermined time period.

21. The processor of claim 18, wherein the method acts undertaken by the logic further include:

subtracting from at least some pulse TOAs a period equal to an integer times (US period) to render respective adjusted pulse TOAs; and averaging together at least two adjusted pulse TOAs to establish the frame TOA.

22. The processor of claim 18, wherein the method acts undertaken by the logic further comprise:

determining whether the expected TOA is within a lull period; and adjusting a frame repetition rate based at least partially thereon.

23. The processor of claim 18, wherein at least one pulse is characterized by a leading edge, a center, and a trailing edge, and the pulse TOA associated therewith is a TOA of the center of the pulse.

24. The processor of claim 18, wherein the pen is movable against a substrate including visible form fields, the processor having access to an electronically stored facsimile of the substrate for electronically correlating pen positions to virtual fields.

* * * * *

UNITED STATES PATENT AND TRADEMARK OFFICE
CERTIFICATE OF CORRECTION

PATENT NO.   : 6,703,570 B1
DATED        : March 9, 2004
INVENTOR(S)  : Russell et al.

It is certified that error appears in the above-identified patent and that said Letters Patent is hereby corrected as shown below:

Drawings,
Please replace old Drawings with new drawings attached.

Signed and Sealed this

Twenty-first Day of December, 2004

JON W. DUDAS
*Director of the United States Patent and Trademark Office*